United States Patent
Delaruelle (10) Patent No.: US 6,658,330 B2
(45) Date of Patent: Dec. 2, 2003

(54) METHOD AND SYSTEM FOR UPGRADING SOFTWARE FOR CONTROLLING LOCOMOTIVES

(75) Inventor: Dale Delaruelle, Melbourne, FL (US)

(73) Assignee: General Electric Co., Schenectady, NY (US)

( * ) Notice: Subject to any disclaimer, the term of this patent is extended or adjusted under 35 U.S.C. 154(b) by 0 days.

(21) Appl. No.: 10/034,968

(22) Filed: Dec. 27, 2001

(65) Prior Publication Data

US 2002/0107616 A1 Aug. 8, 2002

Related U.S. Application Data (60) Provisional application No. 60/258,666, filed on Dec. 29, 2000.

(51) Int. Cl.$^7$ .................................................. G06G 7/70
(52) U.S. Cl. ............................ 701/19; 701/20; 701/29; 707/203; 455/418
(58) Field of Search .............................. 701/19, 20, 29, 701/70; 395/712; 707/203, 10; 455/418, 419; 717/11, 12, 100, 203

(56) References Cited

U.S. PATENT DOCUMENTS

| 5,421,017 | A | 5/1995 | Scholz et al. ............... 717/170 |
| 5,718,487 | A | 2/1998 | Roselli et al. ................. 303/14 |
| 5,960,205 | A | 9/1999 | Mao et al. .................... 717/170 |
| 5,974,454 | A | 10/1999 | Apfel et al. ................. 709/221 |
| 6,052,531 | A | 4/2000 | Waldin, Jr. et al. ......... 397/712 |
| 6,098,006 | A | 8/2000 | Sherwood et al. ............ 701/70 |
| 6,308,061 | B1 | 10/2001 | Criss et al. .................. 455/418 |
| 6,324,692 | B1 | 11/2001 | Fiske .......................... 717/11 |
| 6,324,693 | B1 | 11/2001 | Brodersen et al. ............ 717/11 |
| 6,338,152 | B1 * | 1/2002 | Fera et al. .................... 714/48 |
| 6,347,294 | B1 | 2/2002 | Booker et al. ................ 703/28 |
| 6,360,363 | B1 | 3/2002 | Moser et al. ................. 717/11 |
| 6,360,366 | B1 | 3/2002 | Heath et al. ................. 714/11 |
| 6,430,481 | B1 * | 8/2002 | Lovelace et al. ............. 701/19 |

* cited by examiner

Primary Examiner—Marthe Y. Marc-Coleman
(74) Attorney, Agent, or Firm—Carl A. Rowold; Armstrong Teasdale LLP (57) ABSTRACT

A method of upgrading control software on a first locomotive. The first locomotive includes a first locomotive interface. A first computer is coupled to the first locomotive interface, and a first communicator is coupled to the first computer. The first computer is programmed for operation on the first locomotive. The method includes loading a first version of control software onto the first computer, loading a second version of control software onto the first computer, and using data included in a link message to determine whether the first version or the second version of the control software is used.

39 Claims, 4 Drawing Sheets

METHOD AND SYSTEM FOR UPGRADING SOFTWARE FOR CONTROLLING LOCOMOTIVES

CROSS REFERENCE TO RELATED APPLICATION

This application claims the benefit of U.S. Provisional Application No. 60/258,666, filed Dec. 29, 2000.

BACKGROUND OF THE INVENTION

This invention relates generally to operating railroad locomotives, and more specifically, to controlling locomotives in locomotive consists distributed throughout a train.

Modem trains may include many train cars and have a length that is over a mile long. Such trains typically contain more than one locomotive to provide the necessary driving and stopping power. To facilitate handling of the train, the additional locomotives often appear at locations in the train that are remote from the lead locomotive. For example, it may be difficult to traverse a curve if all the locomotives are at the front of the train due to high wheel-rail friction and resulting high in-train forces. However, dispersal of locomotives throughout a train requires synchronizing their actions, such as accelerating and braking the locomotives in concert.

To solve this problem, radio control equipment was introduced thirty years ago so that acceleration and deceleration controls applied to the lead locomotive are transmitted to all others in the remote locomotive consists at substantially the same time. Before the train gets underway the operator links the various radio control units so that they act in concert to send control data to each locomotive consist in the train and return status/alarm information.

Radio control systems, such as Locotrol®, provide railroads the ability to control locomotives dispersed in a train consist in either a synchronous, or an independent, mode from a control locomotive, which is in the lead position. The system provides control of the remote locomotive consist(s) by command signals sensed at the lead locomotive and transmitted over a data radio link to the remote unit(s). Such control systems allow railroads to optimize the distribution of motive power and braking control over the length of a train. Radio control systems provide faster and smoother starting and stopping of trains, facilitating safer handling and more efficient operations. In addition, they also facilitate increasing rail system throughput and reducing operating costs from the increased hauling capacity, better rail adhesion, and improved fuel efficiency.

Radio controls now play a crucial role in operating large trains safely, which poses a problem in upgrading the software used in the radio control systems. At present units with different versions of radio control software cannot be operated in the same train, this forcing users to operate such locomotives separately. This requirement also imposes a heavy logistical burden on users while the software on the locomotive fleet is being upgraded and increases pressure on software vendors to upgrade the software in all locomotives as quickly as possible to minimize this problem. Safety considerations, however, preclude an automatic radio download of the upgraded software, which necessitates the vendor physically installing and testing the software on each locomotive in a short time.

BRIEF DESCRIPTION OF THE INVENTION

In one aspect, a method is provided of upgrading control software on a first locomotive. The first locomotive includes a first locomotive interface. A first computer is coupled to the first locomotive interface, and a first communicator is coupled to the first computer. The first computer is programmed for operation on the first locomotive. The method includes loading a first version of control software onto the first computer, loading a second version of control software onto the first computer, and using data included in a link message to determine whether the first version or the second version of the control software is used.

In another aspect, a system is provided for controlling a first locomotive. The system includes a first locomotive interface, a first computer that is coupled to the locomotive interface, and a first communicator that is coupled to the first computer. The first computer is programmed to control the first locomotive. The first computer is further programmed to use at least one of a first version of control software and a second version of control software.

In a further aspect, a fleet of locomotives is provided that include at least one locomotive equipped with a system for controlling the at least one locomotive. The system includes a first locomotive interface, a first computer coupled to the first locomotive interface, and a first communicator coupled to the first computer. The first computer is programmed to control the at least one locomotive and to use a first version of control software and a second version of control software.

In yet another aspect, a method is provided for upgrading control software on a first locomotive. The first locomotive includes a first locomotive interface, a first computer coupled to the first locomotive interface, and a first communicator coupled to the first computer. The first computer is programmed for operation on the first locomotive. The method includes providing the control software with functionality to operate with a plurality of locomotive control system configurations, and using data included in link messages to determine which version of the control software is used.

DETAILED DESCRIPTION OF THE INVENTION

As used herein, the term "locomotive consist" means one or more locomotives physically connected together, with one locomotive designated as the controlling locomotive and the others as trailing locomotives. A "train" consist means a combination of cars (freight, passenger, bulk) and at least one locomotive consist. Typically, a train is built in a terminal/yard and the locomotive consist is at the head-end of the train. Occasionally, trains require additional locomotive consists within the train consist or attached to the last car in the train consist. Additional locomotive consists sometimes are required to improve train handling and/or to improve train performance due to the terrain (mountains, track curvature) in which the train will be traveling. A locomotive consist at the head-end of a train may or may not control locomotive consists within the train.

Figure 1:
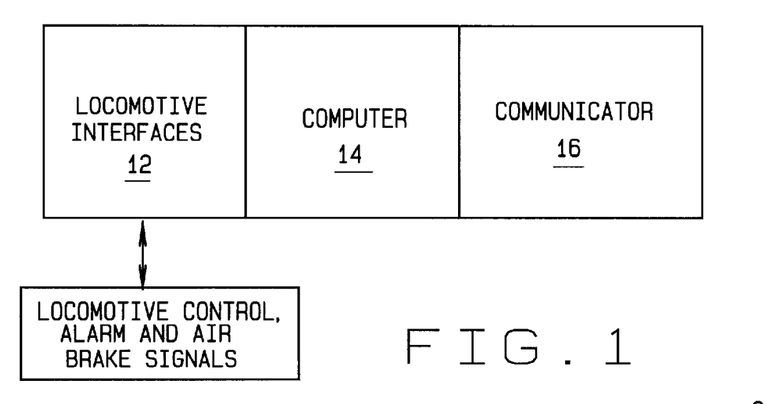
FIG. 1 shows a block diagram of a locomotive control system.

FIG. 1 shows a block diagram 10 of an on-board control system for a locomotive. System 10 includes a locomotive interface 12 that operatively connects the controls of the locomotive to a computer 14. Computer 14 is also operatively connected to a communicator 16. Signals received by communicator 16 are relayed to computer 14, which controls the motion of the locomotive through locomotive traction, dynamic brake and air brake interfaces 12. In one embodiment communicator 16 is a satellite communicator, but other types of communicators suitable for this application will be readily apparent to those skilled in the relevant art.

Figure 2:
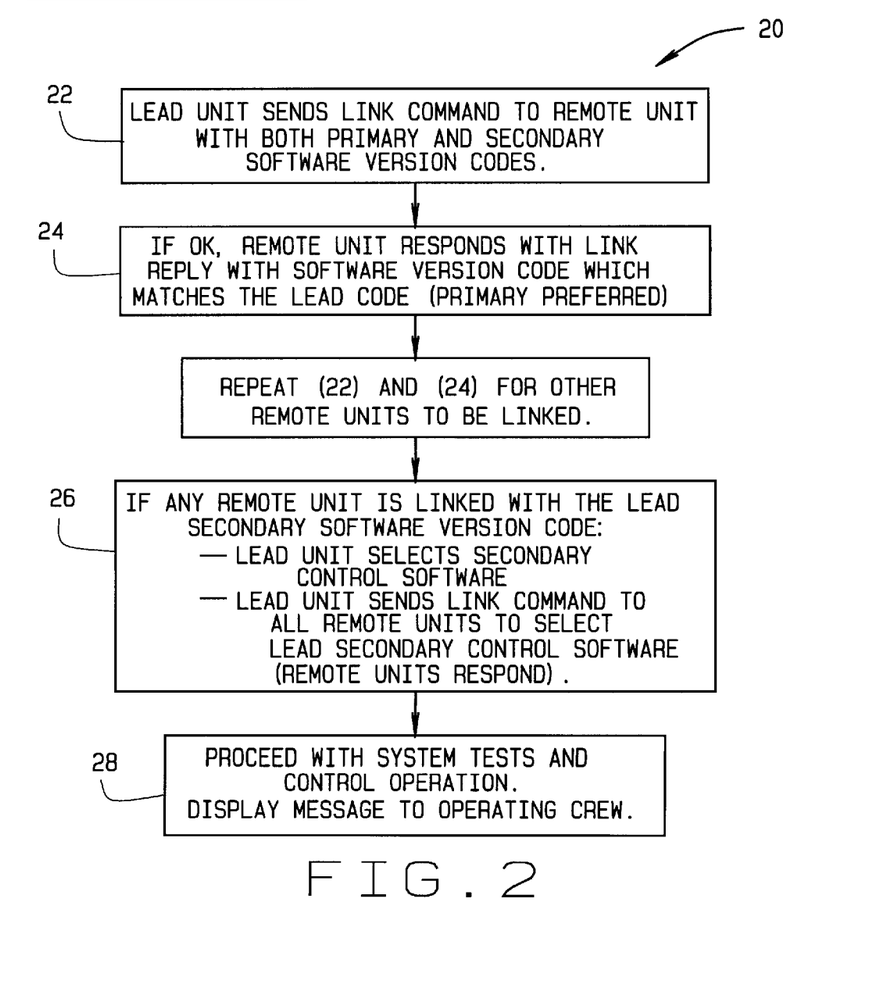
FIG. 2 is a flowchart illustrating an exemplary overall linking process between the locomotive consists in a train.

FIG. 2 is a flowchart 20 illustrating an exemplary general process that is followed when a train is assembled to link locomotives equipped with the on-board control system shown in FIG. 1. From the onset of operation of the train, locomotives exchange link messages that include a link command from the lead locomotive to a remote locomotive, and a link reply in response to the link command. A link command relating to the versions of control software is sent from the communicator on a lead locomotive to the communicator on a remote locomotive in the train. If all checks are successful, the second locomotive responds with a link reply that contains a specification of the version of control software matching the lead unit version. The computer on the lead locomotive then uses the specification of the version of control software on the remote locomotive's computer to select a mutually compatible version of control software and, if necessary, command previously-linked remote units to the same software version.

A first communicator that is operatively coupled to a first computer on a lead locomotive sends 22 a link command to a second communicator that is operatively coupled to a second computer on a remote locomotive which has previously been enabled. The first computer includes two versions of control software loaded onto it, referred to here as the primary version and the secondary version. These two versions would typically correspond to new and previous versions of control software, but as will be readily appreciated, how the versions differ is not critical, and versions differing in other respects would work equally well in the inventive method and system. The second communicator responds 24 to the first communicator with a link reply that contains a specification of the version of control software in use on the second computer. The first computer then selects 26 a version of control software to use based upon the specification received from the second communicator, and displays 28 to the railroad crew the version it selected, as well as the significant operational aspects.

If the two versions of control software correspond to the primary and the secondary version, system 10 selects the primary version only if all locomotives in the train can utilize the primary version. If any locomotive in the train has not yet been upgraded, and all locomotives support the secondary version, system 10 selects the secondary version so that all locomotives can still operate properly. The selection of software version is transparent to the railroad crew. Once a link has been achieved, system 10 displays on a console a message advising the crew of the implications of the version of software that has been selected.

Figure 3:
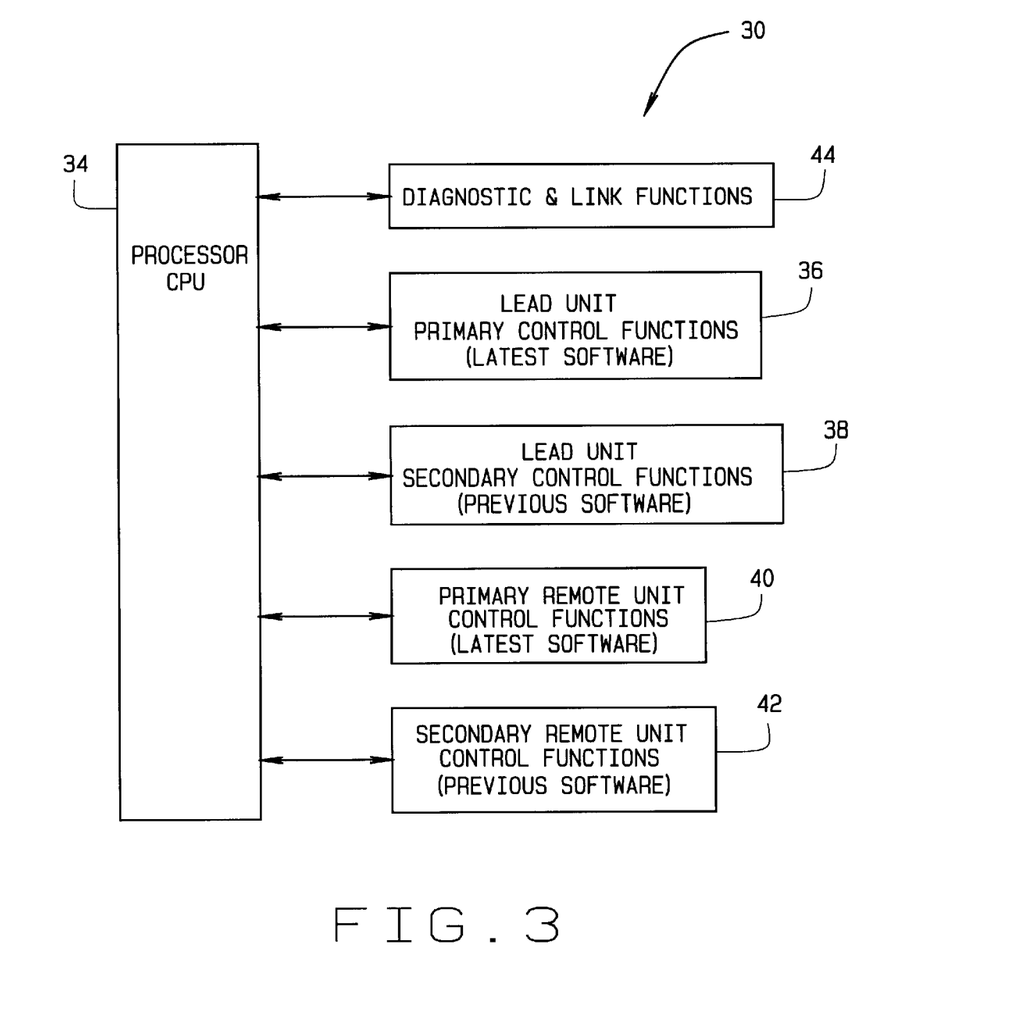
FIG. 3 is a block diagram illustrating an exemplary software memory module/software partition.

FIG. 3 is a block diagram 30 illustrating a software memory module/software partition 32. Each computer 14 includes a central processing unit (CPU) 34 and the functionality 36 for the latest version (primary) of software for lead unit operation, the functionality 38 for the latest version (primary) of software for remote unit operation, the functionality 40 for a previous version (secondary) of software for lead unit operation, and the functionality 42 for a previous version (secondary) of software for remote unit operation. In one embodiment, each computer 14 also includes diagnostics and link functions 44. A numeric code is associated with each software version. For example, an un-upgraded unit might have 45 and 49 respectively for the secondary and primary codes, and an upgraded unit might have 49 and 50 respectively from the secondary and primary codes.

The primary and secondary control functions 36, 38, 40, and 42 are isolated to minimize software code generation and testing when an upgrade is performed. The primary link command from the lead unit includes two software version codes. The primary code indicates the latest software version installed. The secondary code indicates the previous software version installed. If the addressed remote unit includes the software corresponding to the link command primary code, the addressed remote unit responds in the link reply with the link command primary code. If the remote unit does not include the software corresponding to the link command primary code, but does include the software corresponding to the secondary code, the remote unit responds in the link reply with the secondary code. If any remote unit is linked with the lead unit secondary version code, the lead unit re-links all remote units using only the secondary code.

Figure 4:
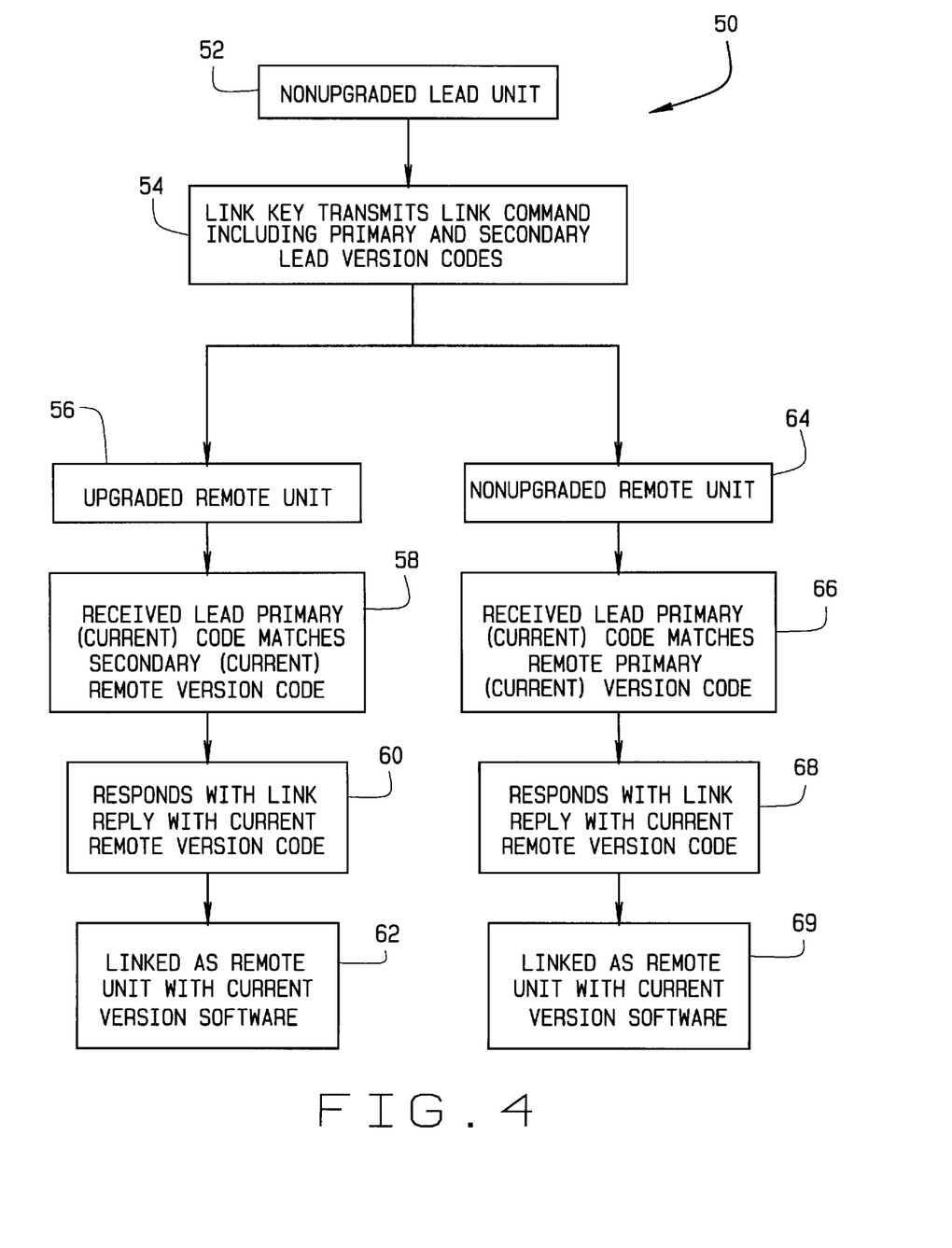
FIG. 4 is a flowchart depicting in detail the linking process between an non-upgraded lead unit and both an upgraded and non-upgraded remote unit.

FIG. 4 is a flowchart 50 showing in detail how system 10 works with an non-upgraded lead locomotive 52, that is a lead locomotive with on-board control system software that has not been upgraded with new software. Non-upgraded lead locomotive 52, in response to selection of a LINK key by the railroad crew, transmits 54 to other locomotives in the train a link command that includes two lead version codes. An upgraded remote locomotive 56 that receives the link command compares the primary lead version code and finds that it matches 58 its secondary version code. Locomotive 56 then responds 60 to locomotive 52 with a secondary version code, and is then linked 62 to locomotive 52 as a "current" remote locomotive.

A non-upgraded remote locomotive 64 that receives the link command compares the primary lead version code and finds that it matches 66 the primary version code present on locomotive 64. Locomotive 64 then responds 68 to locomotive 52 with its primary version code, and is then linked 69 to locomotive 52 as a "current" remote locomotive. Thus non-upgraded lead locomotive can function with both upgraded and non-upgraded remote locomotives, with the former making the necessary accommodation to link to the non-upgraded lead locomotive.

Figure 5:
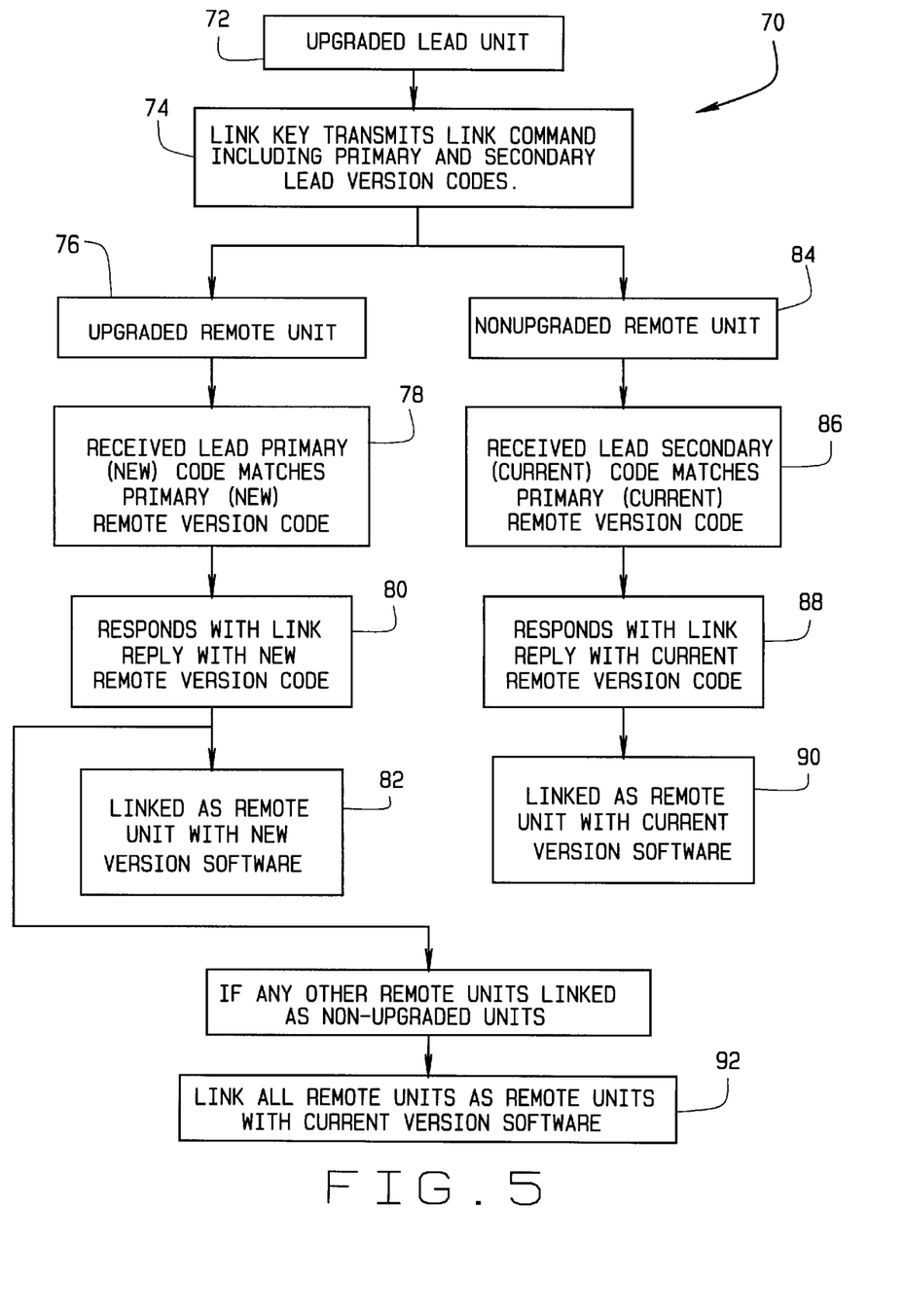
FIG. 5 is a flowchart depicting in detail an exemplary embodiment of the linking process between an upgraded lead unit and both an upgraded and non-upgraded remote unit.

FIG. 5 is an exemplary flowchart 70 illustrating how system 10 functions with an upgraded lead locomotive 72, or more specifically, how system 10 functions with a lead locomotive including an on-board control system that has been upgraded with new software. Upgraded lead locomotive 72, in response to selection of a LINK key by the railroad crew, transmits 74 to other locomotives in the train a link command that includes two lead version codes corresponding to a primary software version and a secondary software version. An upgraded remote locomotive 76 that receives the link command compares the primary lead version code to determine if it matches 78 a primary version code. If it matches 78, locomotive 76 then responds 80 to locomotive 72 with a primary version code, and is then linked 82 to locomotive 72 as a "new" remote locomotive.

A non-upgraded remote locomotive 84 that receives the link command compares the secondary lead version code to determine if it matches 86 a primary version code. If it matches 86, locomotive 84 then responds 88 to locomotive 72 with its primary remote version code, and is then linked 90 to locomotive 72 as a "current" remote locomotive.

If any locomotive is linked as a lead secondary remote locomotive, upgraded lead locomotive 72 then links 92 all remote locomotives in the train as "current" remote locomotives, including those previously linked as "new" locomotives.

Although the invention has been described and illustrated in detail, it is to be clearly understood that the same is intended by way of illustration and example only and is not to be taken by way of limitation. Accordingly the spirit and scope of the invention are to be limited only by the terms of the appended claims and their equivalents.

What is claimed is:

1. A method of upgrading control software on a first locomotive having a first locomotive interface, wherein a first computer is coupled to the first locomotive interface, and a first communicator is coupled to the first computer, and wherein the first computer is programmed for operation on the first locomotive, said method comprising:
    loading a first version of control software onto the first computer;
    loading a second version of control software onto the first computer; and
    using data included in a link message to determine whether the first version or the second version of the control software is used wherein the link message is received from a second locomotive having a second locomotive interface, a second computer coupled to the second locomotive interface, and a second communicator coupled to the second computer, with the second computer programmed to control operation on the second locomotive.

2. A method in accordance with claim 1 wherein the link message comprises a specification of the two versions of the control software present on said second computer on the second locomotive.

3. A method in accordance with claim 2 wherein the first computer on the first locomotive selects a version of the control software in response to said specification.

4. A method in accordance with claim 3 wherein the first computer operates on the first locomotive using the first version of the control software or the second version of the control software.

5. A method in accordance with claim 2 wherein the first computer on the first locomotive displays a message indicating which version of the control software has been selected.

6. A system for controlling a first locomotive, said system comprising a first locomotive interface, a first computer coupled to said locomotive interface, and a first communicator coupled to said first computer, said first computer programmed to control the first locomotive, said first computer further programmed to use at least one of a first version of control software and a second version of control software wherein said first computer is programmed to receive a link message from a second locomotive, said system further comprising a second locomotive interface, a second computer coupled to said locomotive interface, and a second communicator coupled to said second computer, said second computer programmed to control the second locomotive, said second computer further programmed to use a first version of control software or a second version of control software.

7. A system in accordance with claim 6 wherein said link message comprises a specification of the versions of the control software present on the second computer.

8. A system according to claim 7 wherein said first computer selects a version of the control software in response to said specification.

9. A system in accordance with claim 8 wherein said first computer displays a message indicating which version of the control software has been selected.

10. A system according to claim 8 wherein said first computer operates on the first locomotive using the first version of the control software or the second version of the control software.

11. A fleet of locomotives comprising at least one locomotive equipped with a system for controlling said at least one locomotive, said system comprising a first locomotive interface, a second locomotive interface, a first computer coupled to said first locomotive interface, a second computer coupled to said second locomotive interface, a first communicator coupled to said first computer, and a second communicator coupled to said second computer, said first computer programmed to:
    control said at least one locomotive;
    use a first version of control software and a second version of control software; and
    receive a link message from a second locomotive,
    said second computer programmed to:
    control the second locomotive, and
    use a first version of control software or a second version of control software.

12. A system in accordance with claim 11, wherein said link message comprises a specification of the versions of the control software present on the second computer.

13. A system according to claim 12 wherein said first computer selects a version of the control software in response to said specification.

14. A system in accordance with claim 13 wherein said first computer displays a message indicating which version of the control software has been selected.

15. A system according to claim 13 wherein said first computer operates on the first locomotive using the first version of the control software or the second version of the control software.

16. A method of upgrading control software on a first locomotive having a first locomotive interface, a first computer coupled to the first locomotive interface, and a first communicator coupled to the first computer, the first computer programmed for operation on the first locomotive, said method comprising:
    providing the control software with functionality to operate with a plurality of locomotive control system configurations;
    receiving a link message from a second locomotive, and
    using data included in the link message to determine which version of the control software is used,
    said second locomotive having a second locomotive interface, a second computer coupled to the second locomotive interface, and a second communicator coupled to the second computer, wherein the second computer programmed for operation on the second locomotive.

17. A method in accordance with claim 16 wherein the link message comprises a specification of two versions of the control software present on the second computer on the second locomotive.

18. A method in accordance with claim 17 wherein the first computer on the first locomotive selects a version of the control software in response to the specification.

19. A method in accordance with claim 17 wherein the first computer on the first locomotive displays a message indicating which version of the control software has been selected.

20. A method of coordinating the use of a common version of software from potentially different versions of software installed on a plurality of linked pieces of railroad control equipment, wherein at least one of the pieces of railroad control equipment, constituting a first piece of railroad equipment, comprises a railroad locomotive that includes a computer coupled to a communication link and a locomotive interface coupled to the computer for controlling operation of the locomotive, and at least one of the other pieces of railroad control equipment, constituting a second piece of railroad control equipment, includes a computer coupled to a communication link, said method comprising:
    installing at least one version of software on at least the first of the plurality of pieces of railroad control equipment;
    installing at least one version of software on at least the second of the plurality of pieces of railroad control equipment; and
    using data included in a link message transmitted between the first and second pieces of railroad control equipment to determine a version of software that is common between the first and second pieces of railroad control equipment; and
    utilizing the version of software that is common to the first and second pieces of railroad control equipment.

21. A method in accordance with claim 20 wherein utilizing the version of software that is common to the first and second pieces of railroad control equipment comprises utilizing the most recently installed version of software that is common to the first and second pieces of railroad control equipment.

22. A method in accordance with claim 20 wherein utilizing the version of software that is common to the first and second pieces of railroad control equipment comprises utilizing the most recently upgraded version of software that is common to the first and second pieces of railroad control equipment.

23. A method in accordance with claim 20 further comprising installing at least two versions of software on at least one of the plurality of railroad control equipment.

24. A method in accordance with claim 20 wherein installing a first version of software comprises installing a first version of software that controls a communication function between the first and second pieces of equipment.

25. A method in accordance with claim 20 wherein installing a first version of software comprises installing a first version of software that controls the operation of the first piece of equipment.

26. A method in accordance with claim 20 wherein the plurality of pieces of railroad control equipment includes three pieces of railroad equipment, and wherein utilizing the version of software that is common to the first and second pieces of railroad control equipment further comprises utilizing the version of software that is common to all of the linked pieces of railroad control equipment.

27. A method in accordance with claim 20 wherein the second piece of railroad control equipment comprises one of a railroad locomotive, a railyard control tower, and a hand-held remote train control.

28. A computer program embodied on a computer readable medium for coordinating the use of a common version of software from potentially different versions of software installed on a plurality of linked pieces of railroad control equipment, said program comprising:
    a code segment on a first piece of railroad control equipment that receives data included in a link message indicative of versions of software installed on a second piece of railroad control equipment and received from the second piece of railroad control equipment and then:
        a code segment that determines the version of software executing on the first piece of railroad equipment;
        a code segment that determines the version of software executing on the second piece of railroad equipment;
        a code segment that transfers the link message between the first and second pieces of railroad control equipment to determine a version of the software that is common to both pieces of equipment; and
        a code segment that selects the version of software for execution on the first and second pieces of railroad equipment.

29. A computer program according to claim 28 further comprising a code segment that selects the most recently update version of the software that is common to both pieces of railroad control equipment.

30. A computer program according to claim 28 further comprising a code segment that determines a version of communication software executing on all linked pieces of railroad control equipment.

31. A computer program according to claim 28 further comprising a code segment that determines a version of locomotive control software executing on all linked pieces of railroad control equipment.

32. A computer program in accordance with claim 28 comprising a code segment executing on a plurality of pieces of railroad control equipment wherein said railroad control equipment includes at least one of a lead locomotive, a remote locomotive, a railyard control tower, and a hand-held remote train control.

33. A system for coordinating use of a common version of software from potentially different versions of software installed on a plurality of linked pieces of railroad control equipment, wherein at least one of the pieces of railroad control equipment, constituting a first piece of railroad equipment, comprises a railroad locomotive that includes a computer coupled to a communication link and a locomotive interface coupled to said computer for controlling operation of the locomotive, and at least one of the other pieces of railroad control equipment, constituting a second piece of railroad control equipment, includes a computer coupled to a communication link, said system configured to:
    execute at least one version of software installed on said first computer, said computer further configured to have a plurality of versions of software installed simultaneously;
    execute at least one version of software installed on said second computer, said computer further configured to have a plurality of versions of software installed simultaneously; and
    determine a version of software that is common between the first and second pieces of railroad control equipment using data included in a link message transmitted between the first and second pieces of railroad control equipment to; and
    utilize a version of software that is common to the first and second pieces of railroad control equipment.

34. A system in accordance with claim 33 configured to select a most recently installed version of software that is common to the first and second pieces of railroad control equipment for execution.

35. A system in accordance with claim 33 configured to select a most recently upgraded version of software that is common to the first and second pieces of railroad control equipment for execution.

36. A system in accordance with claim 33 configured to execute a first version of software that controls a communication function between the first and second pieces of equipment.

37. A system in accordance with claim 33 configured to execute a first version of software that controls the operation of the first piece of equipment.

38. A system in accordance with claim 33 wherein the plurality of pieces of railroad control equipment includes three pieces of railroad equipment and wherein said system is configured to utilize the version of software that is common to all of the linked pieces of railroad control equipment.

39. A system in accordance with claim 33 wherein the second piece of railroad control equipment comprises one of a railroad locomotive, a railyard control tower, and a hand-held remote train control.

* * * * *

UNITED STATES PATENT AND TRADEMARK OFFICE
CERTIFICATE OF CORRECTION

PATENT NO. : 6,658,330 B2  Page 1 of 1
DATED : December 2, 2003
INVENTOR(S) : Dale Delaruelle It is certified that error appears in the above-identified patent and that said Letters Patent is hereby corrected as shown below:

Column 8,
Line 19, delete "update" and insert therefor -- updated --.
Line 59, after "equipment" delete "to".

Signed and Sealed this

Ninth Day of August, 2005

JON W. DUDAS
*Director of the United States Patent and Trademark Office*